(12) United States Patent
Mai et al.

(10) Patent No.: US 8,616,769 B2
(45) Date of Patent: Dec. 31, 2013

(54) SLIDE RAIL STRUCTURE OF RELATIVE SLIDE ASSEMBLY

(75) Inventors: Chien Cheng Mai, New Taipei (TW); Way Han Dai, New Taipei (TW)

(73) Assignee: First Dome Corporation, New Taipei (TW)

( * ) Notice: Subject to any disclaimer, the term of this patent is extended or adjusted under 35 U.S.C. 154(b) by 105 days.

(21) Appl. No.: 13/219,781

(22) Filed: Aug. 29, 2011

(65) Prior Publication Data

US 2013/0051713 A1 Feb. 28, 2013

(51) Int. Cl.
*F16C 17/00* (2006.01)
*H04M 1/00* (2006.01)

(52) U.S. Cl.
USPC ... 384/26; 455/575.4; 455/575.3; 379/433.12

(58) Field of Classification Search
USPC .............. 384/17–23, 26, 34, 50, 54; 455/575.1–575.9; 16/362, 363, 223, 16/86.2; 379/433.11–433.13; 361/679.01
See application file for complete search history.

(56) References Cited

U.S. PATENT DOCUMENTS

| 7,417,865 | B2 * | 8/2008 | Kim | 361/727 |
| 7,925,310 | B2 * | 4/2011 | Chiu | 455/575.1 |
| 7,936,558 | B2 * | 5/2011 | Chang | 361/679.04 |
| 7,975,348 | B2 * | 7/2011 | Lin | 16/337 |
| 8,020,254 | B2 * | 9/2011 | Lin | 16/334 |
| 2001/0054863 | A1 * | 12/2001 | Uchino et al. | 312/334.12 |
| 2006/0154703 | A1 * | 7/2006 | Kim | 455/575.4 |
| 2008/0161075 | A1 * | 7/2008 | Kim et al. | 455/575.4 |
| 2009/0029749 | A1 * | 1/2009 | Lee | 455/575.4 |
| 2012/0237145 | A1 * | 9/2012 | Mai et al. | 384/26 |
| 2012/0314980 | A1 * | 12/2012 | Chen et al. | 384/26 |
| 2013/0022297 | A1 * | 1/2013 | Mai et al. | 384/26 |

* cited by examiner

*Primary Examiner* — Alan B Waits
(74) *Attorney, Agent, or Firm* — Rosenberg, Klein & Lee (57) ABSTRACT

A slide rail structure of relative slide assembly includes two slide guide members disposed on a slide member. Each slide guide member has a locating section connected with the slide member. The locating section has a slide guide section disposed on one side of the locating section, which side is distal from an edge of the slide member. The slide guide section is bent toward the edge of the slide member. Two pivot seats are pivotally disposed on two sides of a relative slide member. A main support is connected on each pivot seat. The main support has a relative slide guide section disposed on the main support and slidable along the slide guide section. The slide guide section is bent over the locating section in an overlapping state. Therefore, the width and volume of the slide guide member are minified to enlarge internal utility space of the slide member.

23 Claims, 7 Drawing Sheets

SLIDE RAIL STRUCTURE OF RELATIVE SLIDE ASSEMBLY

BACKGROUND OF THE INVENTION

1. Field of the Invention

The present invention relates to a slide rail structure of relative slide assembly, which is able to enhance the utility efficiency of internal space of a slide member.

2. Description of the Related Art

Figure 1:
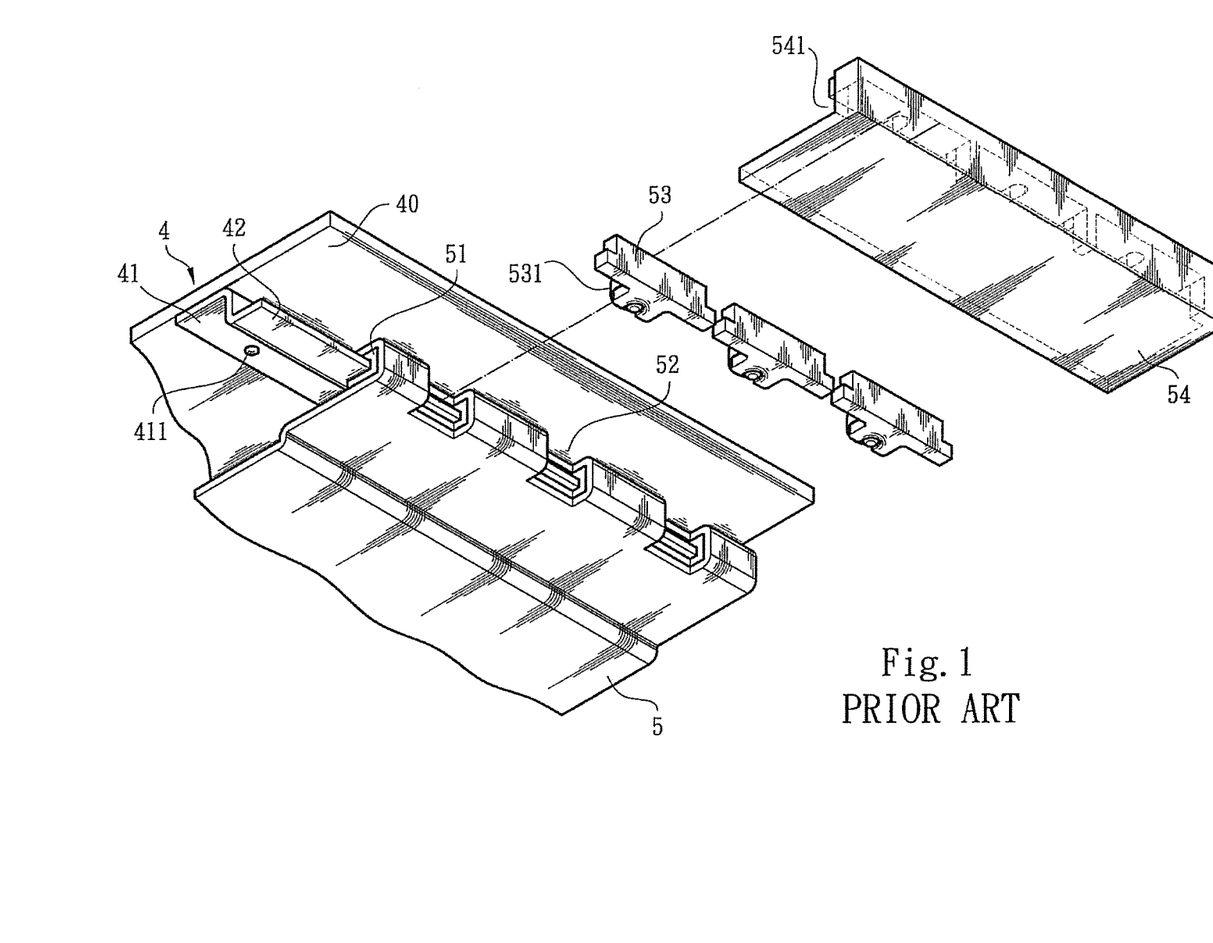
FIG. 1 is a perspective exploded view of the slide rail structure of a conventional relative slide assembly.
Figure 2:
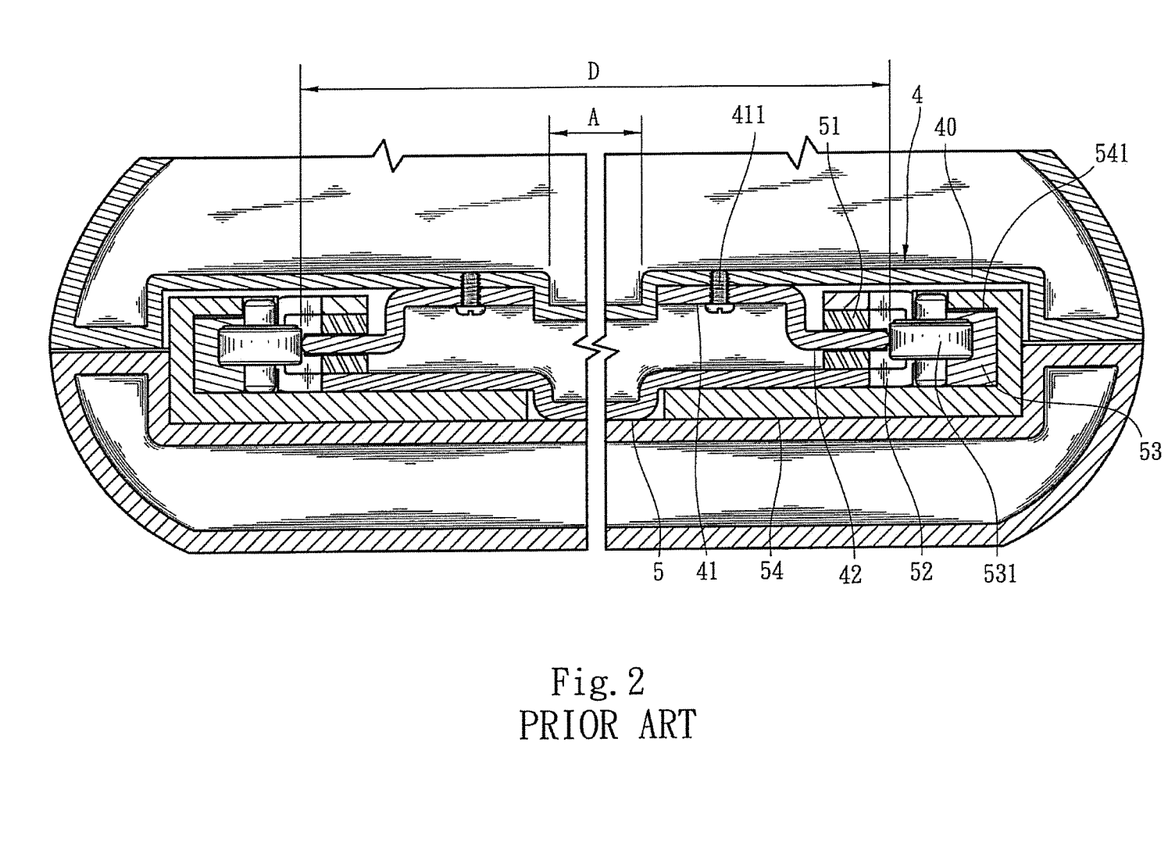
FIG. 2 is a sectional assembled view of the slide rail structure of the conventional relative slide assembly.

FIGS. 1 and 2 show a conventional slide rail structure of relative slide assembly of an electronic device. The slide rail structure includes two parallel slide guide members 4 disposed on a slide member 40, (which can be connected with a slide cover of the electronic device). A fixing section 41 and a slide rail 42 are respectively disposed on two sides of the slide guide member 4. By means of multiple fixing members 411, the fixing section 41 is fixedly connected to a section of the slide member 40, which section is distal from an edge of the slide member 40. The slide rail 42 outward extends toward the edge of the slide member 40. The slide rail structure further includes a relative slide member 5, (which can be connected with a base seat of the electronic device). Two connection sections 51 are respectively disposed on two sides of the relative slide member 5. The connection sections 51 are fitted on the slide rails 42. Each connection section 51 is formed with multiple hollow sections 52 in communication with an interior of the connection section 51. An outer jacket 54 is fitted on outer side of the connection section 51. The outer jacket 54 is formed with multiple receiving spaces 541 in alignment with the hollow sections 52. Each receiving space 541 receives therein a roller seat 53. A roller 531 is rotatably disposed on the roller seat 53. The roller 531 can pass through the hollow section 52 into contact with the slide rail 42. The rollers 531 can roll along the slide rail 42, whereby the slide guide member 4 (slide member 40) can stably slide along the relative slide member 5 at low friction.

In the above structure, the slide rail 42 of the slide guide member 4 outward extends to the lateral side of the slide member 40. The fixing section 41 of the slide guide member 4 is fixedly connected to the slide member 40 and positioned distal from the edge of the slide member 40. In this case, the slide rail 42 and the fixing section 41 of the slide guide member 4 are positioned in different positions on the slide member 40. In case the distance between the rollers 531 is D, after the area occupied by the fixing section 41 and the slide rail 42 of the slide guide member 4 is deducted, the available width (space) of the slide member 40 has a width A as shown in FIG. 2. This limits the versatility of internal design of the electronic product.

SUMMARY OF THE INVENTION

It is therefore a primary object of the present invention to provide a slide rail structure of relative slide assembly, which is able to enlarge the internal available space of the slide member and enhance utility efficiency of internal space of the slide member and promote versatility of the space utility of the electronic device.

It is a further object of the present invention to provide the above slide rail structure of relative slide assembly. The slide rail structure cooperates with a pivot seat structure, whereby the relative slide assembly can be pivotally rotated upward.

To achieve the above and other objects, the slide rail structure of relative slide assembly of the present invention includes: at least one slide guide member having a locating section connectable to a slide member, the locating section having a slide guide section disposed on one side of the locating section, which side is distal from an edge of the slide member, the slide guide section being bent toward the edge of the slide member; and at least one main support connectable to a relative slide member, a relative slide guide section being disposed on the main support, the relative slide guide section being slidable along the slide guide section.

In the above slide rail structure, the locating section further has an outer stop section disposed on the other side of the locating section. The outer stop section is perpendicular to the slide guide section.

In the above slide rail structure, two parallel slide guide members are disposed on the slide member. The slide guide sections of the slide guide members are bent toward two sides of the slide member respectively. Two main supports are disposed on the relative slide member corresponding to the slide guide members. Each main support has a receiving section. The receiving sections of the main supports are inward fitted onto the slide guide sections from two lateral sides.

In the above slide rail structure, a pivot seat is pivotally disposed on the relative slide member. The main support is connected on the pivot seat.

In the above slide rail structure, the relative slide guide section has a recessed receiving space. The main support is further formed with at least one hollow section in communication with the relative slide guide section. At least one rolling member is disposed on the pivot seat in alignment with the hollow section, whereby the rolling member can pass through the hollow section into contact with the slide guide section.

In the above slide rail structure, the rolling member is rotatably disposed on a floating seat. The floating seat abuts against the pivot seat via at least one elastic member.

In the above slide rail structure, the pivot seat is connected to a pivot pin bracket via a pivot pin. The pivot pin bracket is connected on the relative slide member.

The present invention can be best understood through the following description and accompanying drawings, wherein:

DETAILED DESCRIPTION OF THE PREFERRED EMBODIMENT

Figure 3:
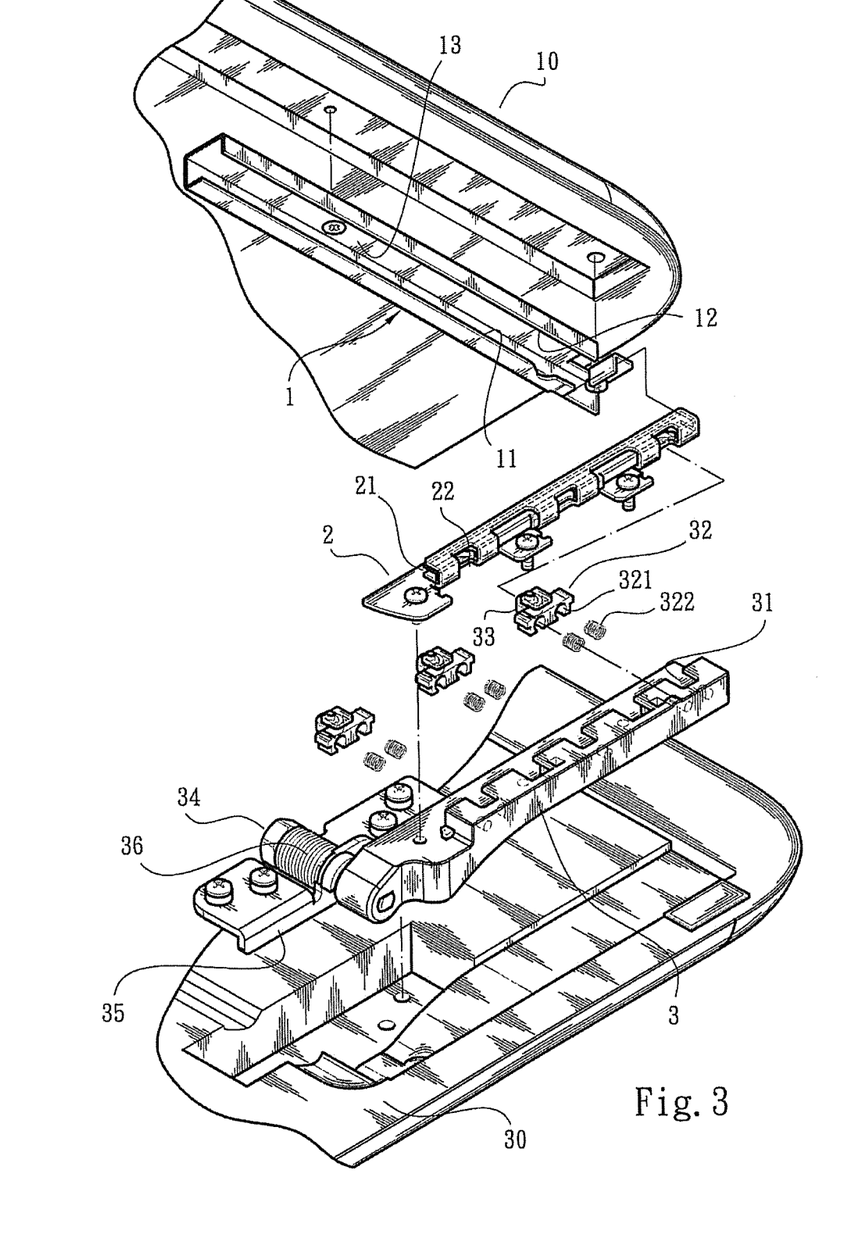
FIG. 3 is a perspective exploded view of the present invention.
Figure 4:
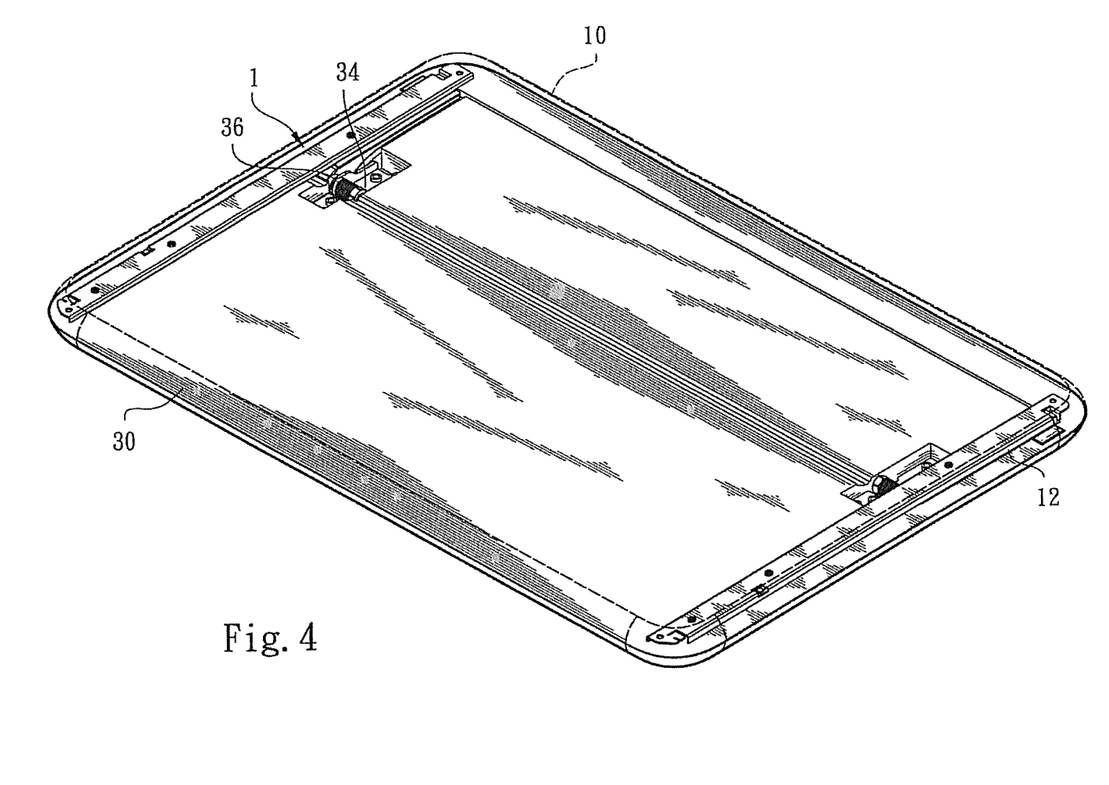
FIG. 4 is a perspective assembled view of the present invention.
Figure 5:
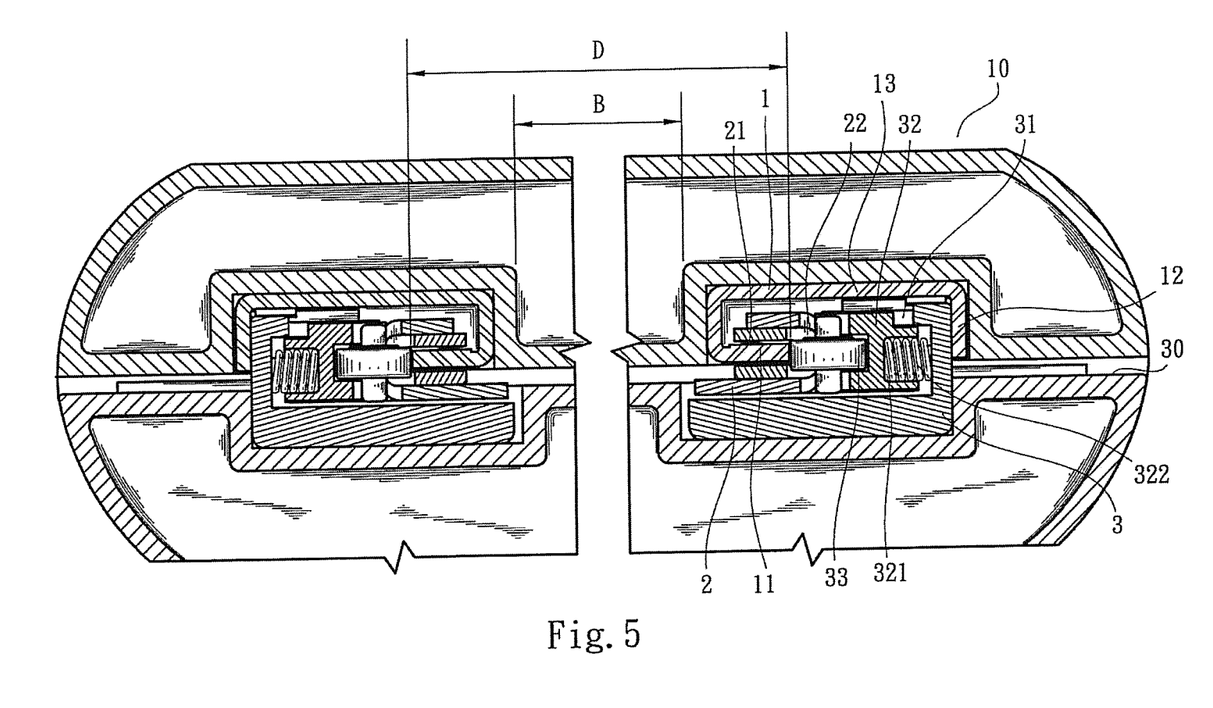
FIG. 5 is a sectional assembled view of the present invention.

Please refer to FIGS. 3 to 5. The present invention includes a slide guide member 1, a main support 2 and a pivot seat 3. The slide guide member 1 is connectable to at least one side of a slide member 10, (which can be a slide cover of an electronic device). The slide guide member 1 has a locating section 13 fixedly connectable to the slide member 10. The locating section 13 has a perpendicularly bent outer stop section 12 disposed on one side of the locating section 13 in adjacency to an edge of the slide member 10. The locating section 13 further has a slide guide section 11, (which can be a guide rail), disposed on the other side of the locating section 13. The slide guide section is bent toward the outer stop section 12. In practice, two slide guide members 1 are respectively disposed on two sides of the slide member 10 in parallel to each other with the slide guide sections 11 outward extending toward two sides of the slide member 10. Via the pivot seat 3, the main support 2 is connectable to a relative slide member 30, (which can be a base seat of an electronic device). A relative slide guide section 21, (which can be a recessed receiving space fitted on the slide guide section 11), is disposed on the main support 2. The relative slide guide section 21 is slidable along the slide guide section 11. The main support 2 is further formed with multiple hollow sections 22 in communication with the relative slide guide section 21. The pivot seat 3 is fixedly connected with the main support 2. Via a pivot pin 34, one end of the pivot seat 3 is pivotally connected to a pivot pin bracket 35 disposed on the relative slide member 30. The pivot pin 34 is fastened to the pivot pin bracket 35 by means of a pivot pin elastic member 36. Accordingly, the pivot seat 3 can be pivotally rotated and located in any angular position. The pivot seat 3 is formed with multiple receiving spaces 31 in alignment with the hollow sections 22 respectively. Each receiving space 31 receives therein a floating seat 32. A rolling member 33, (which can be a roller), is rotatably disposed on the floating seat 32. One side of the floating seat 32 is formed with multiple dents 321 distal from the rolling member 33. Each dent 321 receives therein an elastic member 322 in abutment with inner side of the receiving space 31. Accordingly, the floating seat 32 can urge the rolling member 33 to pass through the hollow section 22 into contact with the slide guide section 11. In practice, two pivot seats 3 are respectively disposed on two sides of the relative slide member 30 for connecting with two parallel main supports 2. The relative slide guide sections 21 of the two main supports 2 are inward fitted onto the slide guide sections 11 of the slide guide members 1 from two lateral sides.

Figure 6:
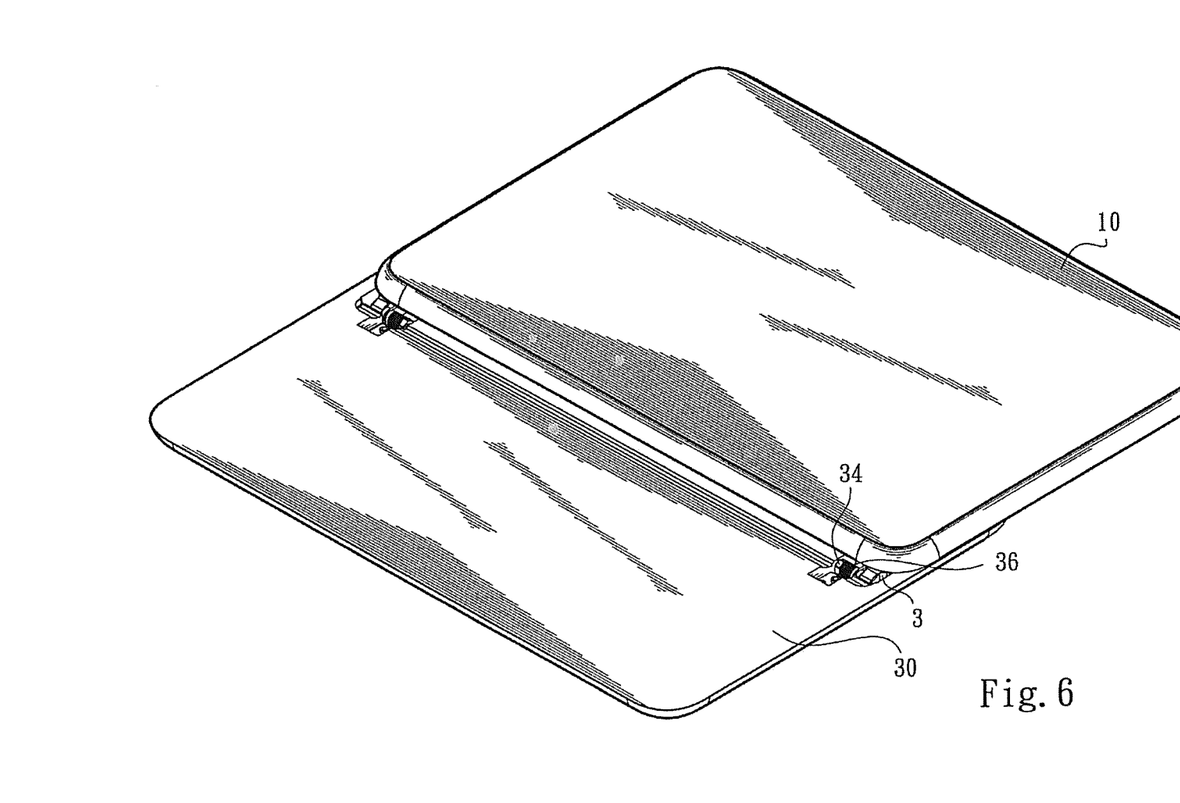
FIG. 6 shows the operation of the present invention in one state.
Figure 7:
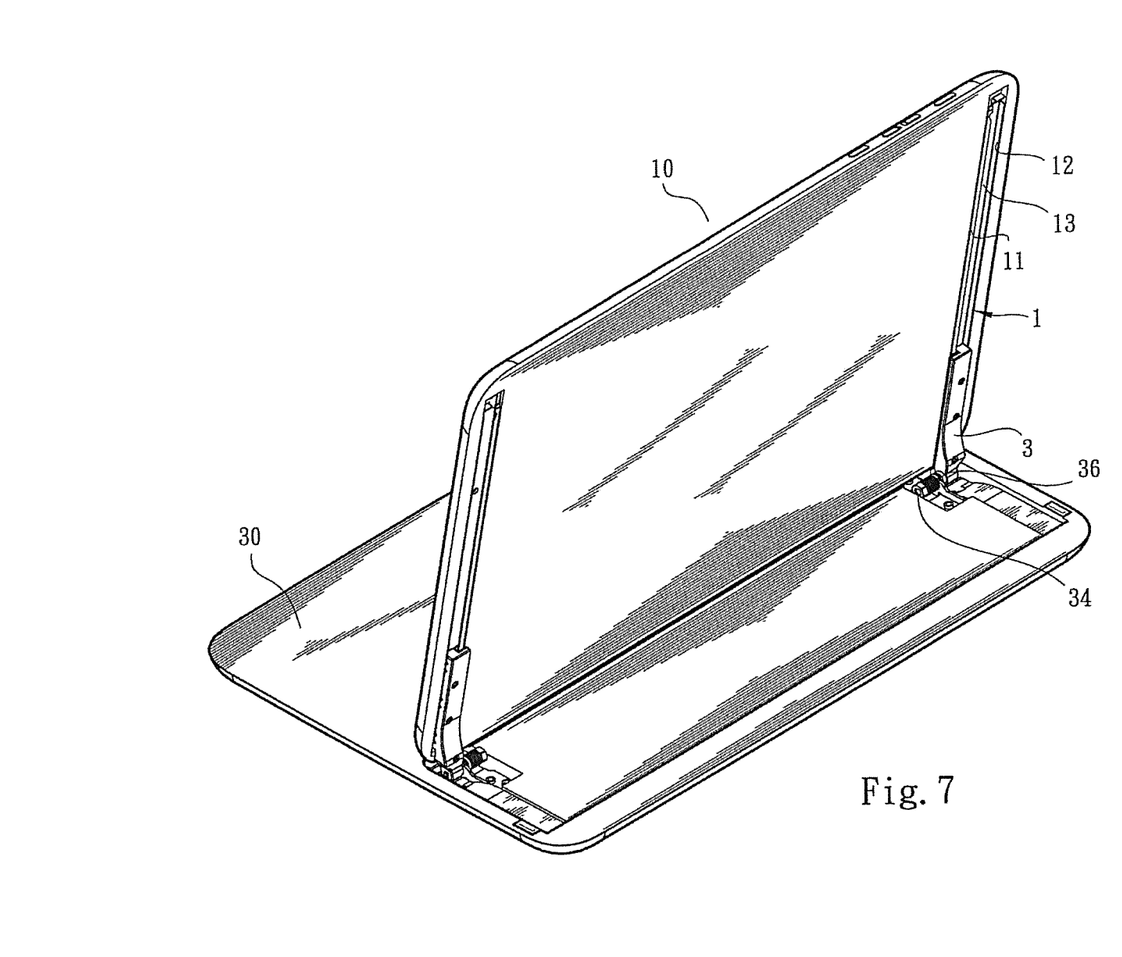
FIG. 7 shows the operation of the present invention in another state.

In practice, the slide guide section 11 of the slide guide member 1 is bent over the locating section 13 in an overlapping state. Therefore, in the case that the distance between the rolling members 33 is D, after the width of the locating section 13 (or the slide guide section 11, whichever is wider), is deducted from the distance D, the available space has a width B as shown in FIG. 5. In case the width of the locating section 13 is equal to that of the aforesaid fixing section 41 and the width of the slide guide section 11 is equal to that of the aforesaid slide rail 42, then in comparison with the conventional width A, the width B apparently is wider. Accordingly, the available space is apparently enlarged to facilitate deployment of internal space of the electronic device. Please refer to FIGS. 6 and 7. The relative slide guide sections 21 of the main supports 2 are inward assembled and connected with the slide guide sections 11. The rolling members 33 elastically abut against the slide guide sections 11, whereby the slide member 10 and the relative slide member 30 are stably and smoothly slidably assembled with each other. Also, after the slide member 10 drives the slide guide member 1 to slide to the end of the opening travel (as shown in FIG. 6), the pivot seats 3 are rotated about the pivot pins 34. By means of the pivot pin elastic members 36, which fasten the pivot pins 34, the slide member 10 can be pivotally rotated upward together with the pivot seats 3 and located in any angular position (as shown in FIG. 7). Accordingly, the use of the electronic device is facilitated.

In conclusion, the slide rail structure of relative slide assembly of the present invention is able to enhance the utility efficiency of internal space of the slide member and promote versatility of the electronic device.

The above embodiment is only used to illustrate the present invention, not intended to limit the scope thereof. Many modifications of the above embodiment can be made without departing from the spirit of the present invention.

What is claimed is:

1. A slide rail structure of a relative slide assembly, comprising:
   at least one slide guide member including:
      a substantially planar locating section connectable to a slide member;
      a slide guide section spaced from the locating section by an intermediate section, the slide guide section extending to terminate at a sliding engagement edge, wherein the locating, intermediate, and slide guide sections define a substantially c-shaped sectional contour; and
   at least one main support connectable to a relative slide member, the main support including a relative slide guide section slidably receiving the slide guide section of the slide guide member therein, the main support thereby maintaining at least one rollable member against the sliding engagement edge.

2. The slide rail structure of a relative slide assembly as claimed in claim 1, wherein the at least one slide guide member further has an outer stop section disposed on a side of the locating section opposite the engagement edge, the outer stop section being perpendicular to the slide guide section.

3. The slide rail structure of a relative slide assembly as claimed in claim 2, wherein two parallel slide guide members are disposed on opposing sides of the slide member, the slide guide sections of the slide guide members being opposingly bent toward respective outer edges of the slide member, two of the at least one main supports being disposed on the relative slide member corresponding to the slide guide members, each main support having a receiving section, the receiving sections of the main supports being inward fitted onto the slide guide sections from opposing lateral sides.

4. The slide rail structure of a relative slide assembly as claimed in claim 3, wherein a pivot seat is pivotally disposed on the relative slide member, the main supports being connected on the pivot seat.

5. The slide rail structure of a relative slide assembly as claimed in claim 4, wherein the relative slide guide section has a recessed receiving space, the main supports being further formed with at least one hollow section in communication with the relative slide guide section, and the at least one rolling member disposed on the pivot seat in alignment with a respective one of the at least one hollow sections to pass therethrough into-contact the slide guide section.

6. The slide rail structure of a relative slide assembly as claimed in claim 5, wherein each of the at least one rolling members are rotatably disposed on a corresponding one of a plurality of floating seats, the floating seats abutting against the pivot seat via at least one elastic member.

7. The slide rail structure of a relative slide assembly as claimed in claim 2, wherein a pivot seat is pivotally disposed on the relative slide member, the main support being connected on the pivot seat.

8. The slide rail structure of a relative slide assembly as claimed in claim 7, wherein the relative slide guide section has a recessed receiving space, the main supports being further formed with at least one hollow section in communication with the relative slide guide section, and the at least one rolling member disposed on the pivot seat in alignment with a respective one of the at least one hollow sections to pass therethrough into-contact the slide guide section.

9. The slide rail structure of a relative slide assembly as claimed in claim 8, wherein each of the at least one rolling members are rotatably disposed on a corresponding one of a plurality of floating seats, the floating seats abutting against the pivot seat via at least one elastic member.

10. The slide rail structure of a relative slide assembly as claimed in claim 7, wherein the pivot seat is connected to a pivot pin bracket via a pivot pin, the pivot pin bracket being connected on the relative slide member.

11. The slide rail structure of a relative slide assembly as claimed in claim 1, wherein two parallel slide guide members are disposed on opposing sides of the slide member, the slide guide sections of the slide guide members being opposingly bent toward respective outer edges of the slide member, two of the at least one main supports being disposed on the relative slide member corresponding to the slide guide members, each main support having a receiving section, the receiving sections of the main supports being inward fitted onto the slide guide sections from opposing lateral sides.

12. The slide rail structure of a relative slide assembly as claimed in claim 11, wherein a pivot seat is pivotally disposed on the relative slide member, the main supports being connected on the pivot seat.

13. The slide rail structure of a relative slide assembly as claimed in claim 12, wherein the pivot seat is connected to a pivot pin bracket via a pivot pin, the pivot pin bracket being connected on the relative slide member.

14. The slide rail structure of a relative slide assembly as claimed in claim 12, wherein the relative slide guide section has a recessed receiving space, the main supports being further formed with at least one hollow section in communication with the relative slide guide section, and the at least one rolling member disposed on the pivot seat in alignment with a respective one of the at least one hollow sections to pass therethrough into-contact the slide guide section.

15. The slide rail structure of a relative slide assembly as claimed in claim 14, wherein each of the at least one rolling members are rotatably disposed on a corresponding one of a plurality of floating seats, the floating seats abutting against the pivot seat via at least one elastic member.

16. The slide rail structure of a relative slide assembly as claimed in claim 15, wherein the pivot seat is connected to a pivot pin bracket via a pivot pin, the pivot pin bracket being connected on the relative slide member.

17. The slide rail structure of a relative slide assembly as claimed in claim 14, wherein the pivot seat is connected to a pivot pin bracket via a pivot pin, the pivot pin bracket being connected on the relative slide member.

18. The slide rail structure of a relative slide assembly as claimed in claim 1, wherein a pivot seat is pivotally disposed on the relative slide member, the main support being connected on the pivot seat.

19. The slide rail structure of a relative slide assembly as claimed in claim 18, wherein the pivot seat is connected to a pivot pin bracket via a pivot pin, the pivot pin bracket being connected on the relative slide member.

20. The slide rail structure of a relative slide assembly as claimed in claim 18, wherein the relative slide guide section has a recessed receiving space, the main supports being further formed with at least one hollow section in communication with the relative slide guide section, and the at least one rolling member disposed on the pivot seat in alignment with a respective one of the at least one hollow sections to pass therethrough into-contact the slide guide section.

21. The slide rail structure of relative a slide assembly as claimed in claim 20, wherein the pivot seat is connected to a pivot pin bracket via a pivot pin, the pivot pin bracket being connected on the relative slide member.

22. The slide rail structure of a relative slide assembly as claimed in claim 20, wherein the each of the at least one rolling members are rotatably disposed on a corresponding one of a plurality of floating seats, the floating seats abutting against the pivot seat via at least one elastic member.

23. The slide rail structure of a relative slide assembly as claimed in claim 22, wherein the pivot seat is connected to a pivot pin bracket via a pivot pin, the pivot pin bracket being connected on the relative slide member.

* * * * *